Patented Sept. 5, 1922.

1,428,061

UNITED STATES PATENT OFFICE.

THOMAS ROUSE, OF STAMFORD HILL, ENGLAND.

MANUFACTURE OF IRON AND STEEL.

No Drawing.   Application filed November 23, 1920.   Serial No. 426,061.

*To all whom it may concern:*

Be it known that I, THOMAS ROUSE, a subject of the King of Great Britain, and resident of Stamford Hill, in the county of Middlesex, England, have invented certain new and useful Improvements in the Manufacture of Iron and Steel, of which the following is a full, clear, and exact description.

The present invention relates to improvements in or relating to the manufacture of iron and steel and has for its object improved treatment for the direct production thereof applicable to the open hearth type of furnace, using granular or pulverulent iron sands or other iron ores or iron-containing material whereby in a simple and efficient manner the iron or steel can be produced of excellent quality and in a soft or ductile condition.

In order to bring such ores or material into a physical condition suitable for metallurgical treatment, various mixtures embodying desired reactive material have been proposed as agglomerates and notably material suitable for producing a glassy slag adapted to obviate re-oxidization of reduced metal, amongst which may be mentioned common salt, and other chlorides, as for instance sal ammoniac, silica and so forth, together with material such as for example, saw-dust, liquid pitch, tar, molasses, marl, carbonates and clay.

In particular it has been proposed to employ as an ore agglomerating agent a solution of ferro-boro-silicate produced as set forth in the specification of the U. S. Patent No. 1109704, dated Sept. 22, 1914, suitable proportions for the said purpose being, as therein specified, about one per cent of ferric oxide and one half per cent calcined borax to the silicate solution. Now it is found that by substantially modifying the composition of the ferro-boro-silicate, a substance results, capable, in addition to its agglomerative properties of effecting, or actively participating in reduction of the metal.

Thus, in the manufacture of iron or steel from ores or other iron containing materials according to the present invention, the ores or iron containing material (hereinafter referred to as ores), in a finely divided condition, are melted with a ferro-boro-silicate so proportioned as to its components, that each component actively and materially contributes in effecting the reduction of the metal. Although the ore is in a finely divided condition before treatment with the ferro-boro-silicate, it need not thereafter be in such condition for smelting purposes.

In practice, the process is found to produce a larger yield of very ductile metal than is possible so far as I am aware by other known processes, the reduction being very complete apparently by reason of the contained oxygen being wholly or mainly driven off in the form of carbonic oxide.

According to one example of the use of a ferro-boro-silicate according to the present invention, the ore to be treated is mixed or agglomerated in a finely divided condition with a ten per cent solution of a ferro-boro-silicate solution comprising a concentrated solution of silicate having a content of from three to four per cent of ferric oxide and from five to eight per cent of calcined borax. The mixture sets rapidly into a compact mass suitable for use as such in a resistance furnace.

Slag producing and carbonaceous material can be added according to requirement, a very pure and almost carbon-free metal resulting, for instance, by using a mixture of eight parts of a ten per cent ferro-boro-silicate solution such as above specified, eighteen parts of carbonaceous material, ten parts of slag forming material and one hundred parts of concentrated ore.

The smelting process can be conducted in a Siemens open hearth type of furnace embodying the usual features of gas generating and combustion chambers with related appliances for generating and circulating steam and reducing gases, heating and circulating air; or it might be carried out in an electric furnace of suitable type but it is found advantageous to employ a plant comprising a Siemens furnace such as set forth in conjunction with electrodes of high conductivity of an alternating three phase installation, suitably arranged in the furnace whereby the initial or heating stages of the process can be effected by the gas furnace and the subsequent treatment by the heating action of the three phase current.

The success of a process, according to the present invention, is greatly promoted by employing in the manner above mentioned electrodes, consisting wholly or substantially wholly of metallic particles rich in titanium and say from six to twelve inches in circumference, whereby a highly advantageous distribution and use of the electric energy in the fusing zone is effected, causing energetic movement of the fluid charge, the titanium itself moreover materially contributing in improving the quality of the product.

When a basic method of production is desired, the furnace walls and hearth are formed of bricks composed of silicon carbide or other suitable refractory material as say, chrome, magnesium, corundum or substances of the spinel group with a superimposed layer of graphite, the hearth being built up suitably for resistance while for an acidic production the furnace walls and hearth can be of bricks composed of silica with a suitable hearth.

When a smelting operation is to be effected by the combined plant, the prepared charge of ore and other material is so arranged on the furnace bottom that the charge itself completes the circuit when the current is admitted, the flow of the current being maintained until the resulting gases, slag and other impurities in the molten metal have been separated and have risen to the surface, after which the metal, then in a very pure condition, is tapped off into molds or the like according to requirement.

The charge treated may comprise manganese or other oxides preferably agglomerated with ferro-boro-silicate such as used for the iron ore and, if desired, alloys of nickle, magnesium, chromium, titanium, aluminium, tungsten or other metal or metals may be added at any suitable stage in accordance with any particular alloy it is desired to produce.

Having thus described my invention, what I claim is;—

1. A method of obtaining iron and steel from iron containing material, which comprises melting the material with a ferro-boro-silicate mixture containing approximately 3% to 4% ferric oxide and 5% to 8% calcined borax to 100% silicate.

2. A method of obtaining iron and steel from comminuted iron containing material which comprises agglomerating the material by means of a ferro-boro-silicate mixture containing 3 to 4 parts ferric oxide, 5 to 8 parts calcined borax, and 100 parts silicate, and smelting the agglomerate.

3. A method according to claim 2, in which the iron containing material is treated with a ferro-boro-silicate in the form of a solution of approximately 10% concentration and the mixture allowed to set into a compact mass before smelting.

4. A method of obtaining iron and steel from comminuted iron containing material, which comprises agglomerating the material by treatment with a 10% solution of a ferro-boro silicate mixture comprising a concentrated solution of silicate containing from 3% to 4% ferric oxide and 5% to 8% calcined borax, and smelting the agglomerate after it has set to a compact mass.

5. A method of obtaining iron and steel from iron containing material which comprises melting the material with a ferro-boro-silicate mixture in an electric furnace having the electrodes thereof containing titanium.

6. A method of obtaining iron and steel from iron containing material, which comprises melting the material with a ferro-boro-silicate mixture in an electric furnace having the electrodes thereof composed largely of metallic particles rich in titanium.

7. A method of obtaining iron and steel from iron containing material, which comprises agglomerating one hundred parts iron containing material, eighteen parts carbonaceous material, and 10% slag forming material by means of a ferro-boro-silicate mixture of eight parts, and smelting the whole.

8. A method of obtaining iron and steel alloys directly from iron containing material in which the materials are substantially in proportions of one hundred parts iron containing material, eighteen parts carbonaceous material, ten parts slag forming material and eight parts ferro-boro-silicate mixture in the form of a solution, comprising one hundred parts silicate, three to four parts ferric oxide, four to five parts calcined borax and smelting the whole together.

9. A method of preparing iron and steel from iron containing material, which comprises agglomerating the iron containing material with ferro-boro-silicate into masses of suitable electric conductivity, initially heating the mass in a gas furnace of the Siemens open-hearth type, and subsequently heating the mass by the passage of an electric current.

10. A method of obtaining low carbon iron and steel from iron containing material which comprises melting together the iron containing material, a ferro-boro-silicate mixture, carbonaceous material and slag forming material by the action of a current passing between electrodes composed largely of metallic particles rich in titanium.

In witness whereof, I have hereunto set my hand.

THOMAS ROUSE.